United States Patent
Montebello et al.

(10) Patent No.: US 9,975,098 B1
(45) Date of Patent: May 22, 2018

(54) BUCKET-HOLDING DEVICE

(71) Applicants: Larry Montebello, Tucson, AZ (US); Robert Bracamonte, Tucson, AZ (US)

(72) Inventors: Larry Montebello, Tucson, AZ (US); Robert Bracamonte, Tucson, AZ (US)

( * ) Notice: Subject to any disclaimer, the term of this patent is extended or adjusted under 35 U.S.C. 154(b) by 0 days. days.

(21) Appl. No.: 15/451,806

(22) Filed: Mar. 7, 2017

(51) Int. Cl.
*B01F 15/00* (2006.01)
*F16B 2/18* (2006.01)

(52) U.S. Cl.
CPC ........ *B01F 15/00733* (2013.01); *F16B 2/185* (2013.01)

(58) Field of Classification Search
CPC ............................ B01F 15/00733; F16B 2/185
USPC ...... 248/158, 161, 157, 163.1, 176.1, 188.1, 248/188.2, 188.8, 146, 154, 346.01, 121, 248/122.1, 125.8; 366/129, 605, 349, 348
See application file for complete search history.

(56) References Cited

U.S. PATENT DOCUMENTS

| | | | | |
|---|---|---|---|---|
| 807,613 A * | 12/1905 | Graves | ...................... | B67B 7/18 248/346.07 |
| 1,227,738 A * | 5/1917 | Bleecker et al. | ......... | B67B 7/18 248/229.15 |
| 1,260,157 A * | 3/1918 | Denton | ............. | H01L 21/67103 165/185 |
| 1,828,249 A * | 10/1931 | Hammond | ............. | A47G 7/025 220/DIG. 8 |
| 2,851,185 A * | 9/1958 | Taylor | ................ | A47G 23/0216 215/386 |
| 3,301,103 A * | 1/1967 | Shultz | ....................... | B67B 7/14 81/3.32 |
| 4,515,195 A * | 5/1985 | Gladstein | ................. | B27L 7/00 144/195.6 |
| 4,877,208 A * | 10/1989 | Kennard, Jr. | ....... | A47J 43/0727 248/146 |
| D311,327 S | 10/1990 | Hughes | | |
| 5,575,490 A * | 11/1996 | Simpson, Jr. | .......... | A01K 97/01 114/43 |
| 6,227,513 B1* | 5/2001 | Richard | ................. | A47G 7/025 211/43 |
| 6,464,184 B1* | 10/2002 | Lytle | ................. | B01F 15/00733 248/126 |
| 6,533,227 B1* | 3/2003 | Rom | ....................... | B44D 3/14 248/148 |
| 7,261,262 B2* | 8/2007 | Dunson | ............. | B01F 15/00733 220/628 |
| 7,494,097 B2* | 2/2009 | Lidie | ................. | B01F 15/00733 248/126 |
| 7,494,103 B1* | 2/2009 | Huebner | ........... | B01F 15/00733 248/310 |
| 7,708,242 B1* | 5/2010 | Petrashune | .............. | B44D 3/14 220/630 |

(Continued)

FOREIGN PATENT DOCUMENTS

GB 2440005 A 1/2008

*Primary Examiner* — Muhammad Ijaz
(74) *Attorney, Agent, or Firm* — Kyle A. Fletcher, Esq.

(57) ABSTRACT

The bucket-holding device is a pedestal that is configured for use with a bucket. The bucket-holding device receives and stores the bucket in a secure manner during filling and mixing operations. The bucket-holding device comprises a platform, a bucket cavity, a rear securing element, and a front securing element. The bucket cavity is formed in the platform. The rear securing element and the front securing element are attached to the platform. The front securing element is foot operated using a pedal.

17 Claims, 4 Drawing Sheets

(56) References Cited

U.S. PATENT DOCUMENTS

| | | | | |
|---|---|---|---|---|
| 8,011,701 B2 * | 9/2011 | Taylor | B44D 3/00 | |
| | | | 248/154 | |
| 8,033,417 B1 * | 10/2011 | Fallacaro | A47J 43/0727 | |
| | | | 220/629 | |
| 8,096,514 B1 * | 1/2012 | Stocker | A47G 19/08 | |
| | | | 248/154 | |
| 8,287,181 B1 * | 10/2012 | Melvin | E04D 15/00 | |
| | | | 248/146 | |
| 8,641,005 B2 * | 2/2014 | Cimaglio | B01F 15/00772 | |
| | | | 248/121 | |
| 8,646,737 B1 * | 2/2014 | Sharpless | B01F 15/00733 | |
| | | | 108/55.1 | |
| 8,746,636 B2 * | 6/2014 | Rauchut | B01F 15/00733 | |
| | | | 248/146 | |
| 8,777,206 B1 * | 7/2014 | Airosa | B44D 3/08 | |
| | | | 248/213.2 | |
| 8,876,069 B2 * | 11/2014 | Cimaglio | B01F 15/00746 | |
| | | | 248/122.1 | |
| 9,004,309 B1 * | 4/2015 | Gardner | B01F 15/00733 | |
| | | | 220/495.01 | |
| 9,555,381 B2 * | 1/2017 | Evans | B01F 11/0008 | |
| 2003/0016586 A1 * | 1/2003 | Williams | B01F 13/002 | |
| | | | 366/349 | |
| 2003/0146352 A1 * | 8/2003 | Zagorsky | B01F 15/00733 | |
| | | | 248/146 | |
| 2004/0021043 A1 * | 2/2004 | Zagorsky | B01F 15/00733 | |
| | | | 248/146 | |
| 2006/0124808 A1 * | 6/2006 | Hibbler | B01F 15/00733 | |
| | | | 248/146 | |
| 2006/0202093 A1 * | 9/2006 | Grosse | B01F 15/00733 | |
| | | | 248/146 | |
| 2007/0076519 A1 * | 4/2007 | Kesling | B01F 7/0045 | |
| | | | 366/129 | |
| 2008/0042035 A1 * | 2/2008 | Elwood | B44D 3/14 | |
| | | | 248/346.03 | |
| 2011/0198457 A1 * | 8/2011 | Rauchut | B01F 15/00733 | |
| | | | 248/154 | |
| 2016/0051951 A1 | 2/2016 | Gorra | | |

* cited by examiner

BUCKET-HOLDING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of separating and mixing, more specifically, a clamping mechanism that holds a container in position during a mixing process.

SUMMARY OF INVENTION

The bucket-holding device is a pedestal that is configured for use with a bucket. The bucket-holding device receives and stores the bucket in a secure manner during filling and mixing operations. The bucket-holding device comprises a platform, a bucket cavity, a rear securing element, and a front securing element. The bucket cavity is formed in the platform. The rear securing element and the front securing element are attached to the platform. The front securing element is foot operated using a pedal.

These together with additional objects, features and advantages of the bucket-holding device will be readily apparent to those of ordinary skill in the art upon reading the following detailed description of the presently preferred, but nonetheless illustrative, embodiments when taken in conjunction with the accompanying drawings.

In this respect, before explaining the current embodiments of the bucket-holding device in detail, it is to be understood that the bucket-holding device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bucket-holding device.

It is therefore important that the claims be regarded as including such equivalent construction insofar as they do not depart from the spirit and scope of the bucket-holding device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
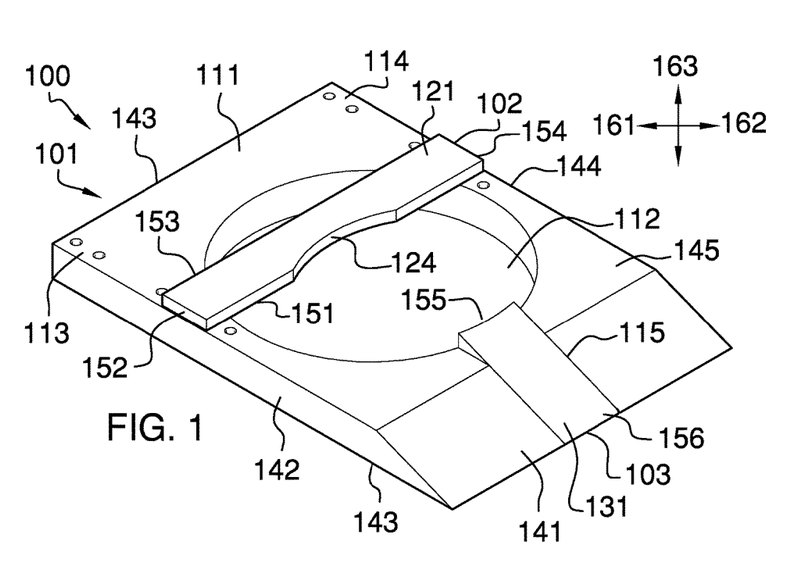
FIG. 1 is a perspective view of an embodiment of the disclosure.
Figure 2:
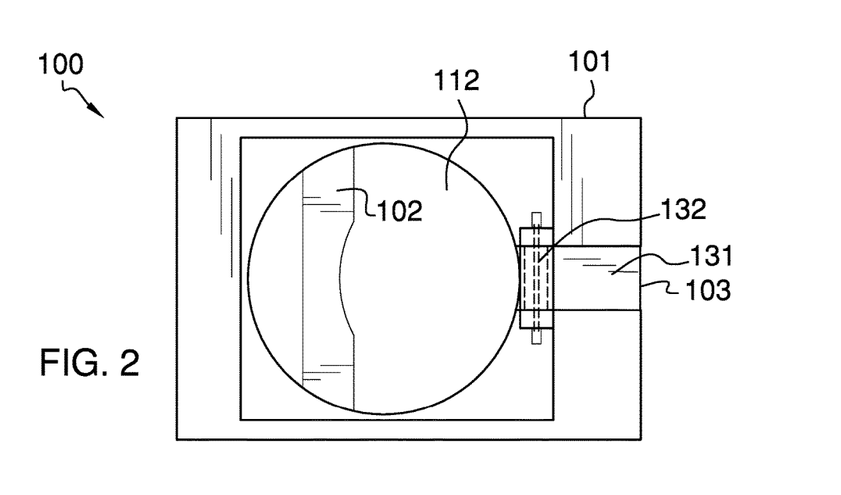
FIG. 2 is a bottom view of an embodiment of the disclosure.
Figure 3:
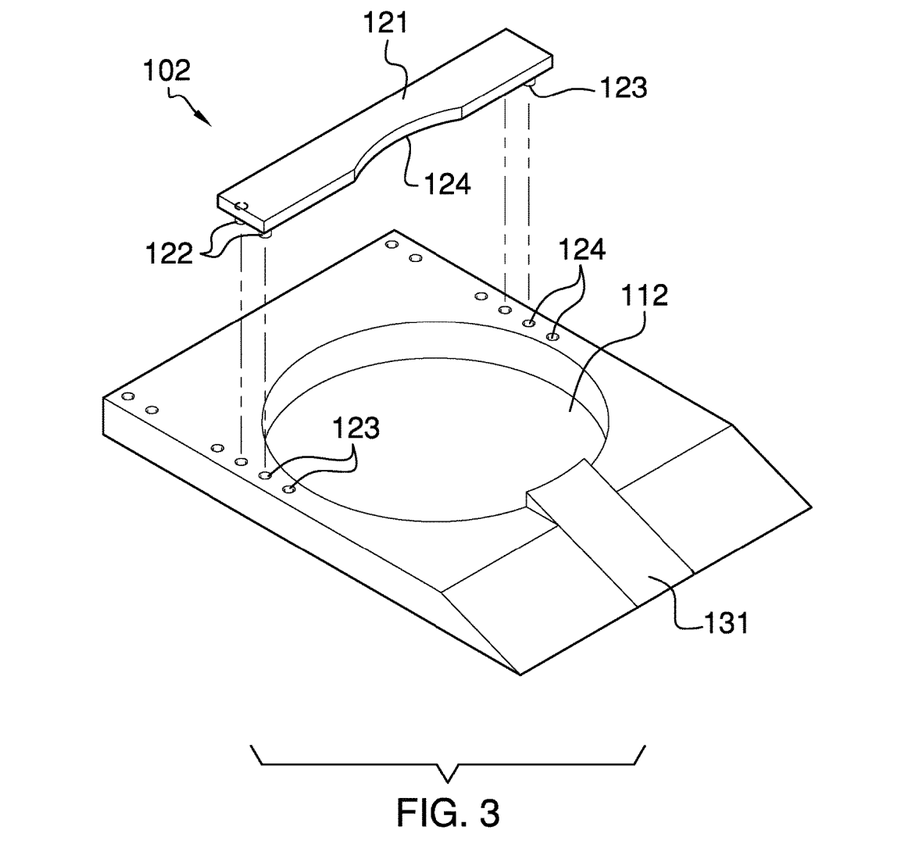
FIG. 3 is an exploded perspective view of an embodiment of the disclosure.
Figure 4:
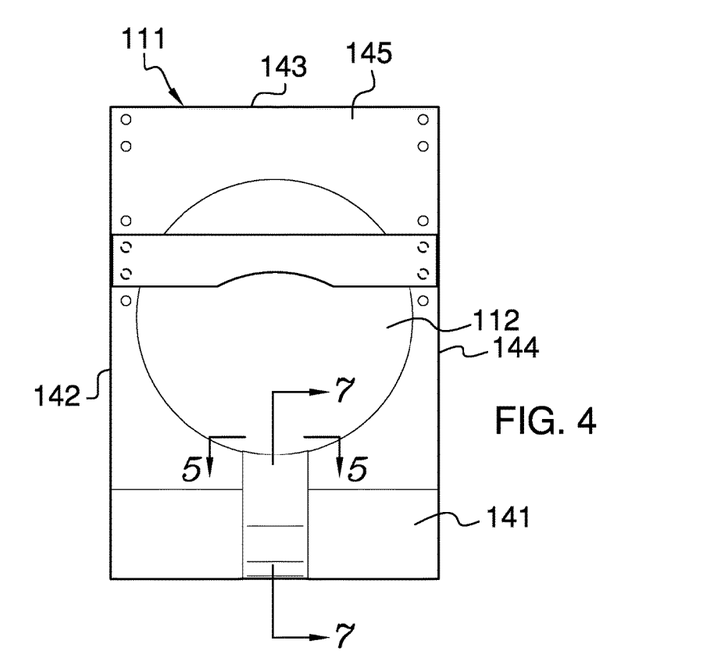
FIG. 4 is a top view of an embodiment of the disclosure.
Figure 5:
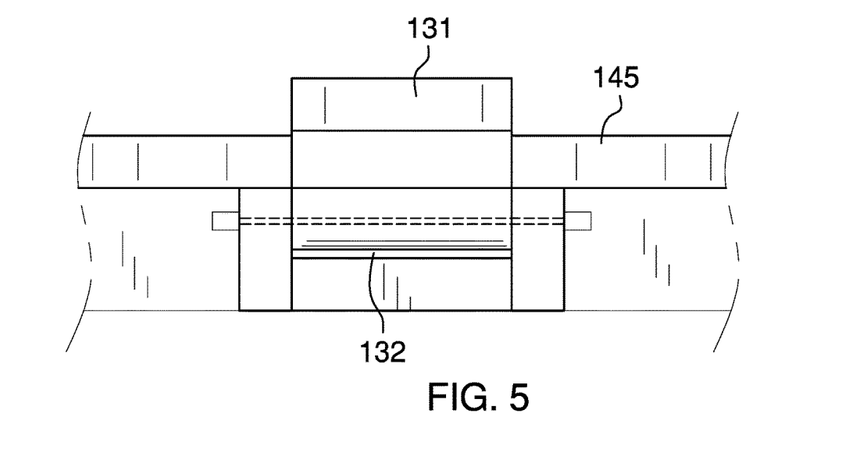
FIG. 5 is a cross-sectional view of an embodiment of the disclosure across 5-5 as shown in FIG. 4.
Figure 6:
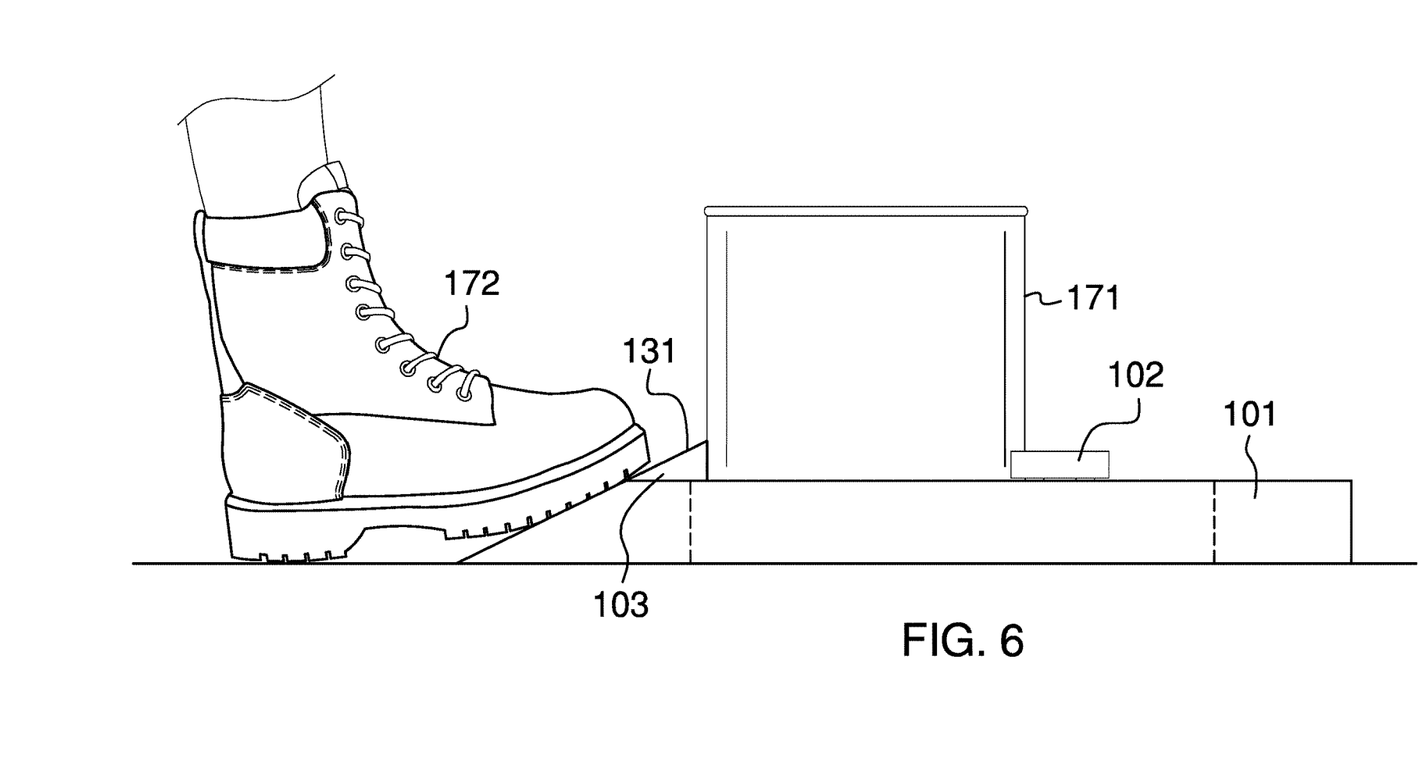
FIG. 6 is an in use view of an embodiment of the disclosure.

Detailed reference will now be made to one or more potential embodiments of the disclosure, which are illustrated in FIGS. 1 through 6.

The bucket-holding device 100 (hereinafter invention) is a pedestal that is configured for use with a bucket 171. The bucket 171 refers to a readily and commercially available bucket 171. The bucket 171 is further defined with an outer diameter. The invention 100 receives and stores the bucket 171 in a secure manner during filling and mixing operations. The invention 100 comprises a platform 101, a bucket cavity 112, a rear securing element 102, and a front securing element 103. The bucket cavity 112 is formed in the platform 101. The rear securing element 102 and the front securing element 103 are attached to the platform 101. The rear securing element 102 and the front securing element 103 secure the bucket 171 within the bucket cavity 112. The front securing element 103 is foot 172 operated using a pedal 131. The foot 172 refers to an appendage of the user. The invention 100 can be adjusted to accommodate changes in the outer diameter between buckets 171 used with the invention 100.

The platform 101 is further defined with a length direction 161, a width direction 162, and a depth direction 163. The length direction 161 is the direction of the invention 100 that runs from the anterior face 141 to the posterior face 143. The width direction 162 is the direction of the invention 100 that: 1) runs from the left face 142 to the right face 144; and, 2) that is perpendicular to the length direction 161. The depth direction 163 is the direction of the invention 100 that: 1) runs from the superior face 145 to the inferior face 146; 2) that is perpendicular to the length direction 161; and, 3) and that is perpendicular to the width direction 162.

The platform 101 is a rectilinear block 111 structure that forms the foundation of the invention 100. The platform 101 comprises a rectilinear block 111, a bucket cavity 112, a plurality of left alignment apertures 113, a plurality of right alignment apertures 114, and a pedal notch 115. The rectilinear block 111 is further defined with an anterior face 141, a left face 142, a posterior face 143, a right face 144, a superior face 145, and an inferior face 146. The bucket cavity 112 is further defined with an inner diameter. Each of the plurality of left alignment apertures 113 is further defined with an inner diameter. Each of the plurality of right alignment apertures 114 is further defined with an inner diameter.

The anterior face 141 is the face of the rectilinear block that is formed by the truncation of the rectangular block structure. The left face 142 is the face of the rectilinear block 111 that is to the left side of the viewer when the anterior face 141 is directly viewed. The posterior face 143 is the face of the rectilinear block 111 that is distal from the anterior face 141. The right face 144 is the face of the rectilinear block 111 that is to the right side of the viewer when the anterior face 141 is directly viewed. The right face 144 is distal from the left face 142. The superior face 145 is the face of the rectilinear block 111 that forms the superior surface of the rectilinear block 111. The superior face 145 is distal from the inferior face 146. The inferior face 146 is the face of the rectilinear block 111 that forms the inferior surface of the rectilinear block 111. The inferior face 146 has a greater surface area than any other face associated with the rectilinear block 111. The inferior face 146 is placed on a horizontal surface during use of the invention 100.

The rectilinear block 111 is a rectangular block structure wherein an edge of the rectangular block structure has been truncated. This truncation of the platform 101 forms a ramp which: 1) may be used to slide a heavy bucket 171 into the platform 101; and, 2) provides a convenient surface for the by foot 172 operation of the front securing element 103. The bucket cavity 112 is a hollow cylindrical cavity that is formed in the superior face 145 of the rectilinear block 111 such that the superior face 145 forms a base of the hollow cylindrical aperture.

Each of the plurality of left alignment apertures 113 comprises a hollow cylindrical aperture that is formed in the superior face 145 of the rectilinear block 111 such that the superior face 145 forms a base of the cylindrical aperture. The center axes of each of the plurality of left alignment apertures 113 are positioned and aligned such that line that is parallel to the superior face 145 and that intersects the center axis of each of the plurality of left alignment apertures 113 will be parallel to the left face 142 of the rectilinear block 111.

Each of the plurality of right alignment apertures 114 comprises a hollow cylindrical aperture that is formed in the superior face 145 of the rectilinear block 111 such that the superior face 145 forms a base of the cylindrical aperture. The center axes of each of the plurality of right alignment apertures 114 are positioned and aligned such that line that is parallel to the superior face 145 and that intersects the center axis of each of the plurality of right alignment apertures 114 will be parallel to the right face 144 of the rectilinear block 111.

For any individual left alignment aperture selected from the plurality of left alignment apertures 113 there is a corresponding individual right alignment aperture selected from the plurality of right alignment apertures 114 such that a line that perpendicularly intersects both the center axis of the selected individual left alignment aperture and center axis of the corresponding individual right alignment aperture will be parallel to both the posterior face 143 and the superior face 145 of the rectilinear block 111.

The pedal notch 115 is a negative space that is formed as a rectilinear structure within the anterior face 141 of the rectilinear block 111. The pedal notch 115 creates the space required for the installation of the front securing element 103 within the platform 101. The pedal notch 115 forms an opening through the face of the cylindrical structure of the bucket cavity 112.

The rear securing element 102 is a device that secures the bucket 171 from the posterior direction of the platform 101. The rear securing element 102 comprises a brace 121, a plurality of left alignment pins 122, a plurality of right alignment pins 123, and a bucket notch 124. The brace 121 is further defined with a first edge 151, a second edge 152, a third edge 153, and a fourth edge 154. The first edge 151 is the edge of the brace 121 that: 1) contains the bucket notch 124; and 2) faces the anterior face 141. The second edge 152 is the edge of the brace 121 that is proximal to the left face 142. The third edge 153 is the edge of the brace 121 that is proximal to the posterior face 143. The fourth edge 154 is the edge of the brace 121 that is proximal to the right face 144.

The brace 121 is a modified rectangular plate structure. The span of the width direction 162 of the brace 121 when it is installed on the platform 101 is lesser than or equal to the span of the width direction 162 of the rectilinear block 111.

Each of the plurality of left alignment pins 122 is a solid cylindrical post that projects perpendicularly away from the surface of the brace 121 that is proximal to the superior face of the rectilinear block 111 when the brace 121 is installed on the rectilinear block 111. Each of the plurality of left alignment pins 122 is further defined with an outer diameter. Each of the plurality of right alignment pins 123 is a solid cylindrical post that projects perpendicularly away from the surface of the brace 121 that is proximal to the superior face 145 of the rectilinear block 111 when the brace 121 is installed on the rectilinear block 111. Each of the plurality of right alignment pins 123 is further defined with an outer diameter.

For any individual left pin selected from the plurality of left alignment pins 122 there is a corresponding individual right alignment pin selected from the plurality of right alignment pins 123 such that a line that perpendicularly intersects both the center axis of the selected individual left alignment pin and center axis of the corresponding individual right alignment pin will be parallel to both the posterior face 143 and the superior face 145 of the rectilinear block 111.

The inner diameter of each of the plurality of left alignment apertures 113 is greater than the outer diameter of each of the plurality of left alignment pins 122 such that any individual left alignment pin selected from the plurality of left alignment pins 122 can be inserted into any individual left alignment aperture selected from the plurality of left alignment apertures 113. The inner diameter of each of the plurality of right alignment apertures 114 is greater than the outer diameter of each of the plurality of right alignment pins 123 such that any individual right alignment pin selected from the plurality of right alignment pins 123 can be inserted into any individual right alignment aperture selected from the plurality of right alignment apertures 114.

The span of the distance of a first line that perpendicularly intersects both the center axis of a selected individual left alignment aperture and the center axis of the corresponding individual right alignment aperture equals the span of the distance of a second line that perpendicularly intersects both the center axis of a selected individual left alignment pin and the center axis of the corresponding individual right alignment pin.

The bucket notch 124 is a negative space that is formed along the first edge 151 of the brace 121. The perimeter of the bucket notch 124 is formed from a segment of a circular circumference. During normal use of the invention 100, the bucket notch 124 is placed against the bucket 171.

The front securing element 103 is a device that secures the bucket 171 from the anterior direction of the platform 101. The front securing element 103 comprises a pedal 131 and a pedal spring 132. The pedal 131 is further defined with a fifth edge and a sixth edge 156. The fifth edge 155 is the edge of the pedal 131 that is proximal to the superior face 145 of the rectilinear block 111. The sixth edge 156 is the edge of the pedal 131 that is distal to the fifth edge 155.

The pedal 131 is a rectangular plate structure. The span of the width direction 162 of the pedal 131 is lesser than the span of the width direction 162 of the pedal notch 115. The length direction 161 of the pedal 131 is greater than the span of the length direction 161 of the anterior face 141 such that when the pedal 131 is depressed the fifth edge 155 of the pedal 131 will project into the interior space of the bucket cavity 112.

To use the invention 100 the bucket 171 is placed within the bucket cavity 112 of the rectilinear block 111. Each of the plurality of left alignment pins 122 is inserted into an individual left alignment apertures selected from the plurality of left alignment apertures 113 such that the bucket notch 124 presses against the bucket 171. Each of the plurality of right alignment pins 123 is inserted into the corresponding right alignment apertures of the selected individual left alignment apertures. The foot 172 then depresses the pedal 131 into the pedal notch 115 such that the fifth edge 155 of the pedal 131 presses against the bucket 171.

The following definitions were used in this disclosure:

Align: As used in this disclosure, align refers to an arrangement of objects that are: 1) arranged in a straight line; or, 2) arranged to give a directional sense of a plurality of parallel lines.

Anterior: As used in this disclosure, anterior is a term that is used to refer to the front side or direction of an object. When comparing two objects, the anterior object is the object that is closer to front of the object.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Chevron: As used in this disclosure, chevron is a term that is used to describe an object that has the shape of an inverted V.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Correspond: As used in this disclosure, the term correspond means that a first object is in some manner linked to a second object in a one to one relationship.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder, which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Inner Diameter: As used in this disclosure, the term inner diameter is used in the same way that a plumber would refer to the inner diameter of a pipe.

Negative Space: As used in this disclosure, negative space is a method of defining an object through the use of open or empty space as the definition of the object itself, or, through the use of open or empty space to describe the boundaries of an object.

Notch: As used in this disclosure, a notch is: 1) an indentation formed in an edge; or 2) a cavity or aperture formed within a surface.

Outer Diameter: As used in this disclosure, the term outer diameter is used in the same way that a plumber would refer to the outer diameter of a pipe.

Pedal: As used in this disclosure, a pedal is a foot operated lever that is used by the foot to power mechanical devices.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal.

Posterior: As used in this disclosure, posterior is a term that is used to refer to the side of an object that is distal to or in the opposite direction of the anterior side. When comparing two items, the posterior item is the item that is distal from the front of the object.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Relaxed Shape: As used in this disclosure, a structure is considered to be in its relaxed state when no shear, strain, or torsional forces are being applied to the structure.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Superior: As used in this disclosure, the term superior refers to a directional reference that is parallel to and in the opposite direction of the force of gravity.

Torsion Spring: As used in this disclosure, a torsion spring is a mechanical device that stores mechanical energy through an opposing torque when the mechanical device is twisted. The torsion spring will return to its original position when the twisting force is removed.

Truncated: As used in this disclosure, a geometric object is truncated when an apex, vertex, or end is cut off by a plane.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A clamping mechanism comprising:
wherein the clamping mechanism comprises a platform, a rear securing element, and a front securing element;
wherein a bucket cavity is formed in the platform;
wherein the rear securing element and the front securing element are attached to the platform;
wherein the rear securing element and the front securing element secure a bucket within the bucket cavity of the platform;
wherein the front securing element is foot operated;
wherein the clamping mechanism receives and stores the bucket during filling and mixing operations;
wherein the clamping mechanism is adjusted to accommodate the outer diameter of the bucket;
wherein the platform is further defined with a length direction, a width direction, and a depth direction;
wherein the platform comprises a rectilinear block, a plurality of left alignment apertures, a plurality of right alignment apertures, and a pedal notch;
wherein the bucket cavity, the plurality of left alignment apertures; the plurality of right alignment apertures, and the pedal notch are formed in the rectilinear block;
wherein the rectilinear block is further defined with an anterior face, a left face, a posterior face, a right face, a superior face, and an inferior face;
wherein the bucket cavity is further defined with an inner diameter;
wherein each of the plurality of left alignment apertures is further defined with an inner diameter;
wherein each of the plurality of right alignment apertures is further defined with an inner diameter;
wherein the rectilinear block is a rectangular block structure wherein an edge of the rectangular block structure has been truncated;
wherein the anterior face is the face of the rectilinear block that is formed by the truncation of the rectangular block structure;
wherein the anterior face of the platform forms a ramp.

2. The clamping mechanism according to claim 1 wherein the bucket cavity is a hollow cylindrical cavity that is formed in the superior face of the rectilinear block such that the superior face forms a base of the hollow cylindrical aperture.

3. The clamping mechanism according to claim 2
wherein each of the plurality of left alignment apertures comprises a hollow cylindrical aperture that is formed in the superior face of the rectilinear block such that the superior face forms a base of the cylindrical aperture;
wherein each of the plurality of right alignment apertures comprises a hollow cylindrical aperture that is formed in the superior face of the rectilinear block such that the superior face forms a base of the cylindrical aperture;
wherein the center axes of each of the plurality of left alignment apertures are positioned and aligned such that line that is parallel to the superior face and that intersects the center axis of each of the plurality of left alignment apertures will be parallel to the left face of the rectilinear block;
wherein the center axes of each of the plurality of right alignment apertures are positioned and aligned such that line that is parallel to the superior face and that intersects the center axis of each of the plurality of right alignment apertures will be parallel to the right face of the rectilinear block.

4. The clamping mechanism according to claim 3
wherein the posterior face is the face of the rectilinear block that is distal from the anterior face;
wherein for any individual left alignment aperture selected from the plurality of left alignment apertures there is a corresponding individual right alignment aperture selected from the plurality of right alignment apertures such that a line that perpendicularly intersects both the center axis of the selected individual left alignment aperture and center axis of the corresponding individual right alignment aperture will be parallel to both the posterior face and the superior face of the rectilinear block.

5. The clamping mechanism according to claim 4
wherein the pedal notch is a negative space that is formed as a rectilinear structure within the anterior face of the rectilinear block;

wherein the pedal notch forms an opening through the face of the cylindrical structure of the bucket cavity.

6. The clamping mechanism according to claim 5 wherein the rear securing element comprises a brace, a plurality of left alignment pins, a plurality of right alignment pins, and a bucket notch;

wherein the plurality of left alignment pins, the plurality of right alignment pins, and the bucket notch are attached to the brace;

wherein the first edge is the edge of the brace contains the bucket notch;

wherein the first edge faces the anterior face;

wherein the brace is a modified rectangular plate structure;

wherein each of the plurality of left alignment pins is further defined with an outer diameter;

wherein each of the plurality of right alignment pins is further defined with an outer diameter.

7. The clamping mechanism according to claim 6 wherein each of the plurality of left alignment pins is a solid cylindrical post that projects perpendicularly away from the surface of the brace that is proximal to the superior face of the rectilinear block;

wherein each of the plurality of right alignment pins is a solid cylindrical post that projects perpendicularly away from the surface of the brace that is proximal to the superior face of the rectilinear block.

8. The clamping mechanism according to claim 7 wherein for any individual left pin selected from the plurality of left alignment pins there is a corresponding individual right alignment pin selected from the plurality of right alignment pins such that a line that perpendicularly intersects both the center axis of the selected individual left alignment pin and center axis of the corresponding individual right alignment pin will be parallel to both the posterior face and the superior face of the rectilinear block.

9. The clamping mechanism according to claim 8 wherein the inner diameter of each of the plurality of left alignment apertures is greater than the outer diameter of each of the plurality of left alignment pins such that any individual left alignment pin selected from the plurality of left alignment pins can be inserted into any individual left alignment aperture selected from the plurality of left alignment apertures.

10. The clamping mechanism according to claim 9 wherein the bucket notch is a negative space;

wherein the perimeter of the bucket notch is formed from a segment of a circular circumference;

wherein the bucket notch is placed against the bucket.

11. The clamping mechanism according to claim 10 wherein the front securing element comprises a pedal and a pedal spring;

wherein the pedal attaches to the pedal spring;

wherein the pedal is further defined with a fifth edge and a sixth edge;

wherein the fifth edge is the edge of the pedal that is proximal to the superior face of the rectilinear block;

wherein the sixth edge is the edge of the pedal that is distal to the fifth edge;

wherein the pedal is a rectangular plate structure;

wherein the span of the width direction of the pedal is lesser than the span of the width direction of the pedal notch.

12. The clamping mechanism according to claim 11 wherein the length direction of the pedal is greater than the span of the length direction of the anterior face such that when the pedal will project into the interior space of the bucket cavity.

13. The clamping mechanism according to claim 12 wherein the pedal spring is a torsion spring.

14. The clamping mechanism according to claim 13 wherein the pedal spring attaches the pedal to the rectilinear block within the pedal notch.

15. The clamping mechanism according to claim 14 wherein each of the plurality of left alignment pins is inserted into an individual left alignment apertures selected from the plurality of left alignment apertures such that the bucket notch presses against the bucket.

16. The clamping mechanism according to claim 15 wherein each of the plurality of right alignment pins is inserted into the corresponding right alignment apertures of the selected individual left alignment apertures.

17. The clamping mechanism according to claim 16 wherein the foot depresses the pedal into the pedal notch such that the fifth edge of the pedal presses against the bucket.

\* \* \* \* \*